United States Patent [19]

Kosugi

[11] Patent Number: 5,098,030
[45] Date of Patent: Mar. 24, 1992

[54] PRETENSIONER IN SEAT BELT APPARATUS

[75] Inventor: Noriyuki Kosugi, Shiga, Japan
[73] Assignee: Takata Corporation, Tokyo, Japan
[21] Appl. No.: 576,830
[22] Filed: Sep. 4, 1990

[30] Foreign Application Priority Data

Sep. 4, 1989 [JP] Japan .................. 1-230215

[51] Int. Cl.⁵ .......................................... B65H 75/48
[52] U.S. Cl. .............................................. 242/107
[58] Field of Search ............ 242/107, 107.3, 107.4 A, 242/107.4 R, 107.4 B, 107.4 C, 107.4 D, 107.5

[56] References Cited

U.S. PATENT DOCUMENTS

| | | | |
|---|---|---|---|
| 4,455,000 | 6/1984 | Nilsson | 242/107 X |
| 4,597,544 | 7/1986 | Fohl | 242/107.4 B |
| 4,618,108 | 10/1986 | Buterop et al. | 242/107 |
| 4,750,685 | 6/1988 | Frei | 242/107.4 R X |
| 4,750,686 | 6/1988 | Fohl | 242/107 |
| 4,925,123 | 5/1990 | Frei et al. | 242/107 |
| 4,932,603 | 6/1990 | Yamanoi et al. | 242/107 |
| 4,979,694 | 12/1990 | Grabinski et al. | 242/107 |
| 4,991,790 | 2/1991 | Fohl et al. | 242/107 |
| 5,004,178 | 4/1991 | Kobayashi et al. | 242/107 |

Primary Examiner—Daniel P. Stodola
Assistant Examiner—John P. Darling
Attorney, Agent, or Firm—Armstrong, Nikaido, Marmelstein, Kubovcik & Murray

[57] ABSTRACT

A pretensioner for removing slack from a seat belt having a slack removing mechanism drive actuated in response to a detection signal indicative of a prescribed degree of deceleration of a vehicle, and pawl gears which, owing to a driving force produced by the drive, and meshed with a gear that co-rotates with a seat belt take-up reel, rotates the take-up reel in a direction that removes slack from the seat belt. When deceleration of a predetermined magnitude is sustained, as at the time of a collision, slack in the seat belt is removed reliably and the amount of tightening of the seat belt is substantially constant. As a result, the seat belt functions at maximum effectiveness to effectively restrain the passenger wearing the seat belt.

2 Claims, 5 Drawing Sheets

PRETENSIONER IN SEAT BELT APPARATUS

BACKGROUND OF THE INVENTION

This invention relates to a seat belt apparatus used in a vehicle such as an automobile. More particularly, the invention relates to a pretensioner which, at the moment the vehicle sustains a collision, tightens a seat belt in a direction which restrains the body of the passenger wearing the seat belt.

A seat belt apparatus installed at the seat of an automobile functions to restrain the body of the passenger wearing the seat belt in an emergency situation such as when the vehicle sustains a collision, thereby protecting the passenger from an injury caused by striking the body of the vehicle.

When the passenger is restrained by such a seat belt apparatus, the restraining action diminishes unless the seat belt is so fastened as not to separate from the body of the passenger, i.e., in such a manner that a gap will not form between the belt and the passenger's body. The reason for this is that the amount of movement of the passenger's body due to inertia at the moment of impact increases by an amount equivalent to the separation between the passenger's body and the seat belt, and hence there is the danger that the passenger will strike the vehicle body.

Accordingly, a retractor equipped with a pretensioner has been proposed in view of the foregoing problem. With such a retractor, a passenger's body is restrained by causing a reel to rotate by a pretensioner in a direction that takes up the seat belt on the reel at the moment of a collision, thereby minimizing forward movement of the passenger when a collision occurs. Such a retractor is capable of allowing the seat belt to perform its function to a satisfactory extent.

FIG. 6 is a perspective view of this retractor equipped with a pretensioner according to the prior art. The retractor, shown at numeral 101, includes a reel shaft 103 on which a seat belt 102 is so wound as to be freely taken up and paid out, a pulley 104 fixedly secured to one end of the reel shaft 103, a wire rope 105, which comprises a plurality of twisted metal wires, wound several turns on the outer periphery of the pulley 104 with a prescribed clearance therebetween, and tensioning means 106 for tensioning the wire rope 105.

With seat belt retractor 101 having the pretensioner constructed as set forth above, the tensioning means 106 does not operate when the vehicle is traveling in ordinary fashion, namely in a manner in which the only deceleration that can be produced is less than a prescribed value. As a result, the wire rope 105 is not tensioned and the prescribed clearance exists between the wire rope 105 and the pulley 104 at such time. Accordingly, the seat belt 102 can be pulled freely from the retractor 101.

When the vehicle sustains a predetermined degree of deceleration, a deceleration sensor (not shown) senses this deceleration and produces a commensurate output signal, in response to which the tensioning means 106 is actuated to rapidly tension the wire rope 105 in the direction A in FIG. 6. The rapidly tensioned wire rope 105 is taken up on the pulley 104 as the clearance between the two quickly vanishes, and the pulley 104 is rapidly rotated in the direction B owing to a frictional force between the pulley 104 and wire rope 105. Since this rotation of the pulley 104 is accompanied by rotation of the reel shaft 103 also in the direction B, the seat belt 102 is taken up on the reel. Consequently, the seat belt 102 is pulled back to eliminate the gap between the seat belt and the passenger's body, namely the slack in the seat belt 102.

Since the seat belt retractor 101 equipped with the pretensioner having this construction is capable of rapidly tightening the seat belt 102 about the passenger's body at the moment of impact, the retractor is considered to be effective in preventing a decline in the restraining action of the seat belt.

In the pretensioner of the seat belt retractor 101 of this kind, the arrangement is such that the wire rope 105 tensioned by the tensioning means is wound up on the pulley 104, which is an integral part of the reel, when the pretensioner operates. Accordingly, owing to the friction between the wire rope 105 and pulley 104, a force is transmitted from the wire rope 105 to the pulley 104.

However, in this configuration where force is transmitted by means of friction, slip always develops between the wire rope 105 and the pulley 104. As a consequence, the seat belt 102 cannot be tightened reliably and the amount of tightening is not constant. Though it can be arranged to predict the amount of slip as an expedient for dealing with this problem, the degree of tightening will no longer be adequate if the amount of slip exceeds the predicted value thereof, and tightening will be excessive if the amount of slip is less than the predicted value.

Thus, with the conventional pretensioner, tightening of the seat belt 102 cannot be performed reliably. Moreover, the amount of tightening of the seat belt 102 changes depending upon the magnitude of the friction between the wire rope 105 and the pulley 104.

SUMMARY OF THE INVENTION

Accordingly, an object of the present invention is to provide a pretensioner in a seat belt apparatus in which tightening of the seat belt can be performed reliably and the amount of tightening can be rendered constant.

According to the present invention, the foregoing object is attained by providing a pretensioner in a seat belt apparatus provided with a slack removing mechanism which, in response to a detection signal indicative of deceleration greater than a predetermined value, rotates a seat belt take-up reel in a direction that removes slack from the seat belt. The pretensioner is characterized in that the slack removing mechanism comprises drive means actuated in response to the detection signal indicative of deceleration, and an engaging member which, owing to a driving force produced by the drive means, is meshed with a gear that co-rotates with the reel for rotating the reel in a direction that removes slack from the seat belt.

Further, the present invention is characterized in that the engaging member is biased at all times in the direction of the gear by a spring.

Further, the present invention is characterized in that there is provided a wire rope for transmitting the driving force of the drive means to the engaging member, one end of the wire rope being attached to the engaging member in such a manner that this end will detach when a prescribed force greater than that which meshes the engaging member with the gear is applied.

In the pretensioner of the seat belt apparatus according to the present invention constructed as set forth above, under ordinary conditions the drive means does not operate and therefore the engaging member does not mesh with the gear that co-rotates with the reel. Accordingly, the seat belt can be drawn out freely at such time.

When a large amount of deceleration is sensed as at the time of a collision, the drive means is actuated by the resulting detection signal. Owing to the driving force produced by the drive means, the engaging member is meshed with the gear that co-rotates with the reel, and the gear, namely the reel, is rotated in the direction that tightens the seat belt.

Since the engaging member meshes with the gear, there is no slip between the engaging member and the gear. Accordingly, not only is the driving force from the drive means transmitted to the gear reliably without loss, but the amount of gear rotation is rendered constant. As a result, the amount of tightening of the seat belt also is rendered constant to assure that the seat belt will exhibit a highly stabilized restraining action.

In addition, by biasing the engaging member in the direction of the gear at all times using the spring, the engaging member is meshed with the gear more quickly and reliably by the driving force from the drive means.

Furthermore, the end of the wire rope is attached to the engaging member so as to become detached therefrom when a predetermined force larger than the force that meshes the engaging member with the gear is applied. As a result, after the seat belt is tightened by the pretensioner, the engaging member is cut off from the wire rope and drive means so that use of the retractor is assured.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENTS

Embodiments of the present invention will now be described with reference to the drawings.

Figure 1:
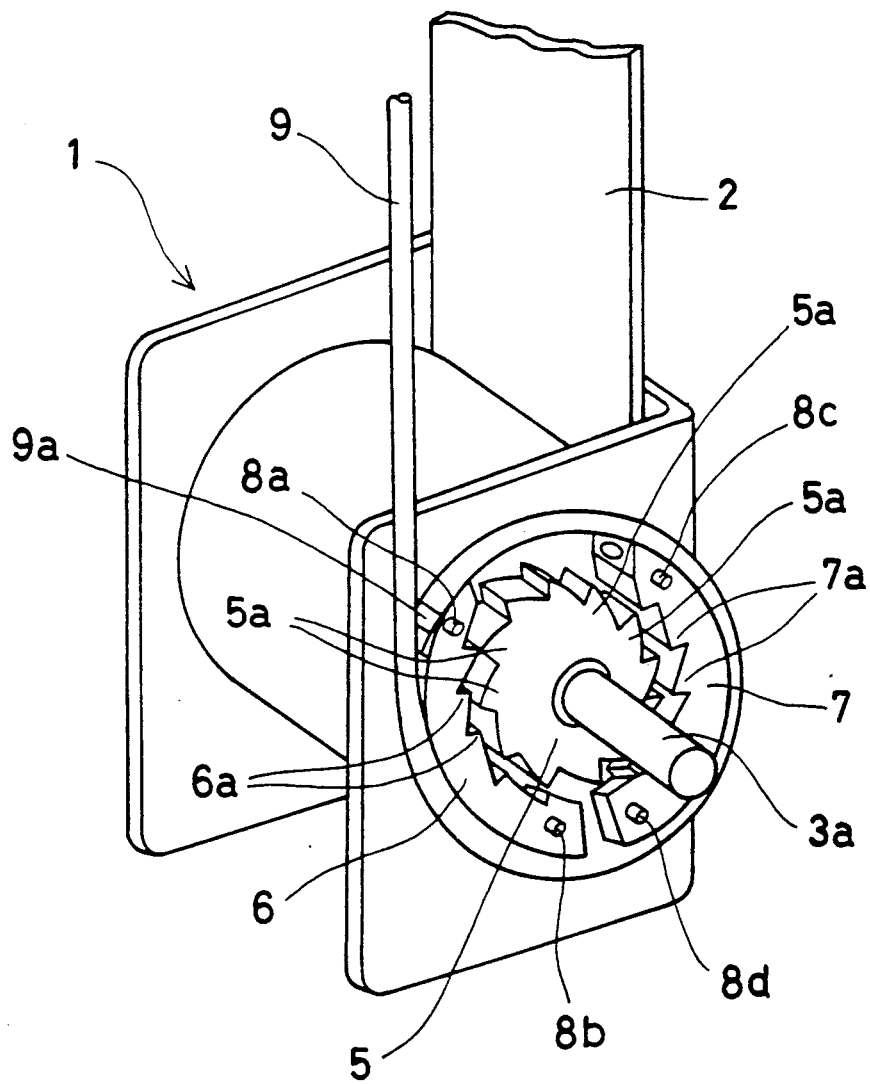
FIG. 1 is a perspective view of a retractor equipped with an embodiment of a pretensioner in a seat belt apparatus according to the present invention.
Figure 3:
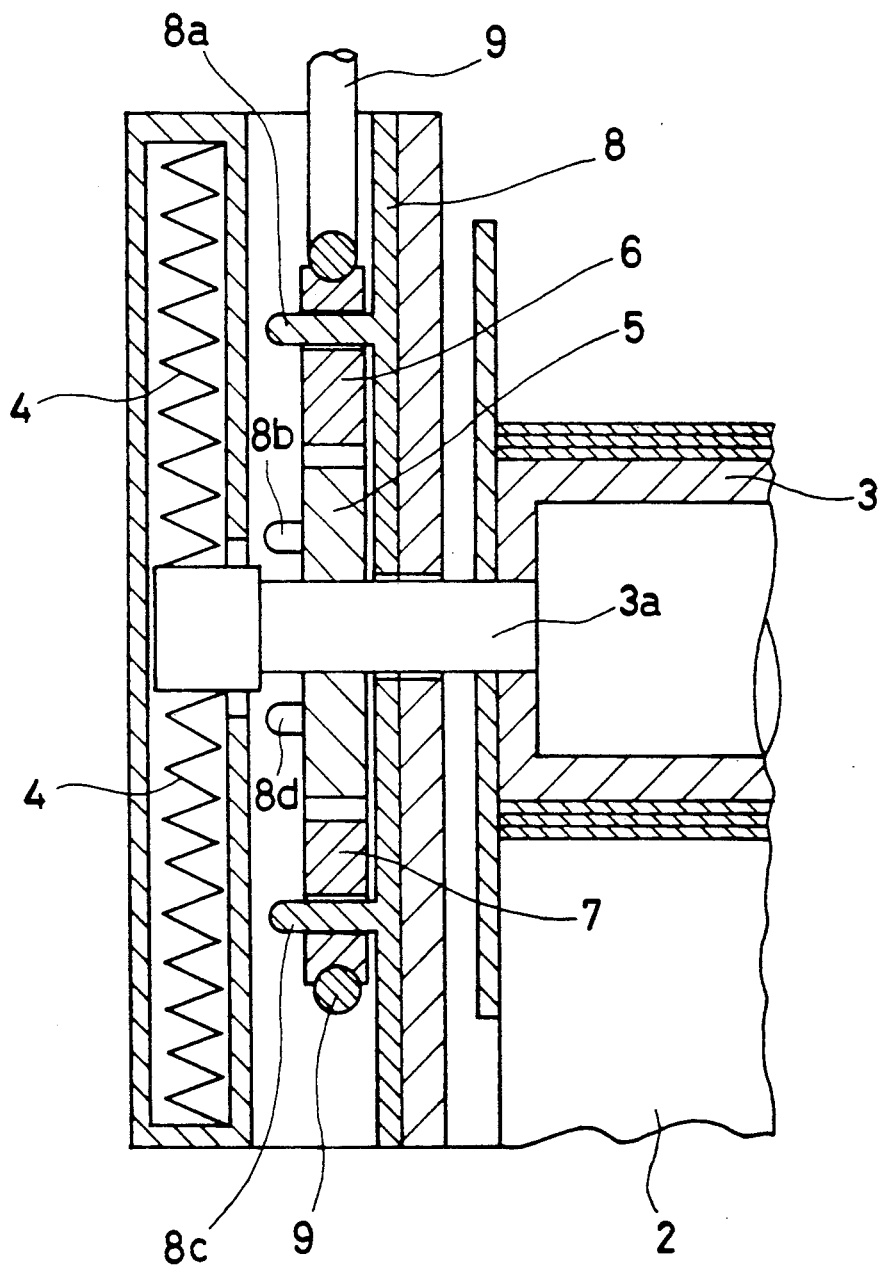
FIG. 3 is a sectional view taken along line III—III of FIG. 2.
Figure 6:
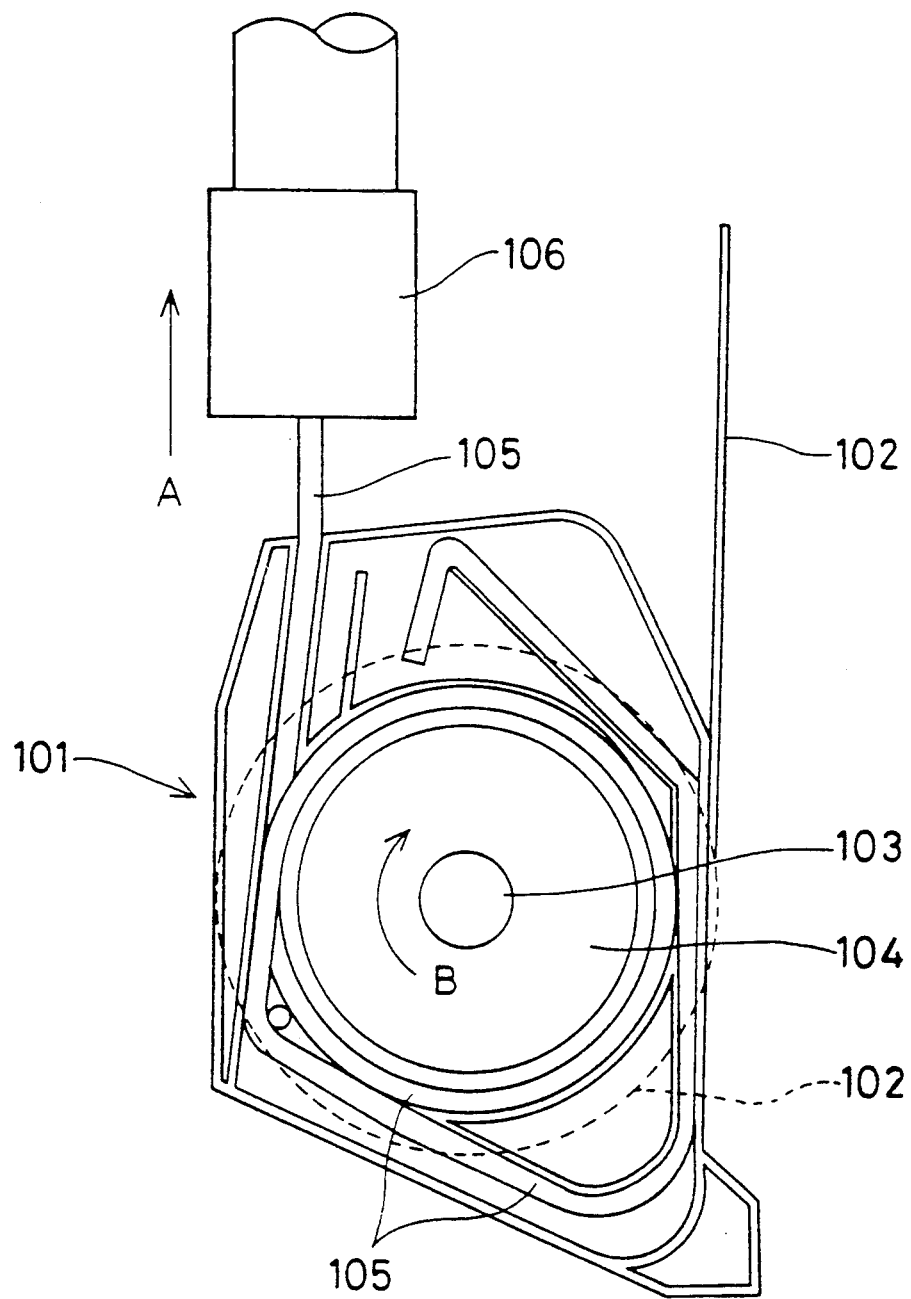
FIG. 6 is a perspective view of a retractor equipped with a pretensioner according to the present invention.

As shown in FIGS. 1 and 3, a seat belt retractor 1 includes a reel 3 on which a seat belt 2 is wound so as to be freely taken up and paid out. The retractor 1 has a construction substantially the same as that of the conventional retractor 101 shown in FIG. 6. For example, as in the conventional retractor 101, the reel 3 has a rotary shaft 3a to which a spring 4 is connected. The spring 4 produces a biasing force that constantly biases the reel 3 in a direction to take up the seat belt 2 thereon. When the seat belt 2 is about to be pulled off from the reel 3 at a deceleration greater than that of a predetermined value, rotation of the reel 3 is locked by a reel locking mechanism (not shown), just as in the prior art, thereby preventing any further extraction of the seat belt.

A gear 5 comprising gear teeth 5a on the outer circumference thereof is attached to the rotary shaft 3a of the reel 3. Accordingly, the gear 5 rotates in unison with the reel 3.

A pair of pawl gears 6, 7 are arranged in close proximity to the gear 5 so as to surround the same in spaced-apart relation. The pawl gear 6 is supported on location pins 8a, 6b, and the pawl gear 7 is supported on location pins 8c, 8d. The pins 8a, 6b, 8c, 8d are provided on a retainer 8 and upstand therefrom. The retractor 1 has a frame 1a to which the retainer 8 is secured. The location pins 8a through 8d are designed so as to snap when subjected to a shearing force in excess of a predetermined magnitude. The arrangement is such that when the pins 8a through 8d snap, the pair of pawl gears 6, 7 are capable of moving toward the gear 5 to contact the same.

The side faces of the pawl gears 6, 7 that confront the teeth 5a of the gear 5 are formed to have teeth 6a, 7a, respectively. The design is such that when the pawl gears 6, 7 move in the direction of the gear 5, the teeth 6a, 7a engage the teeth 5a only if the reel 3 is rotating in a direction to take up the seat belt 2.

Figure 2:
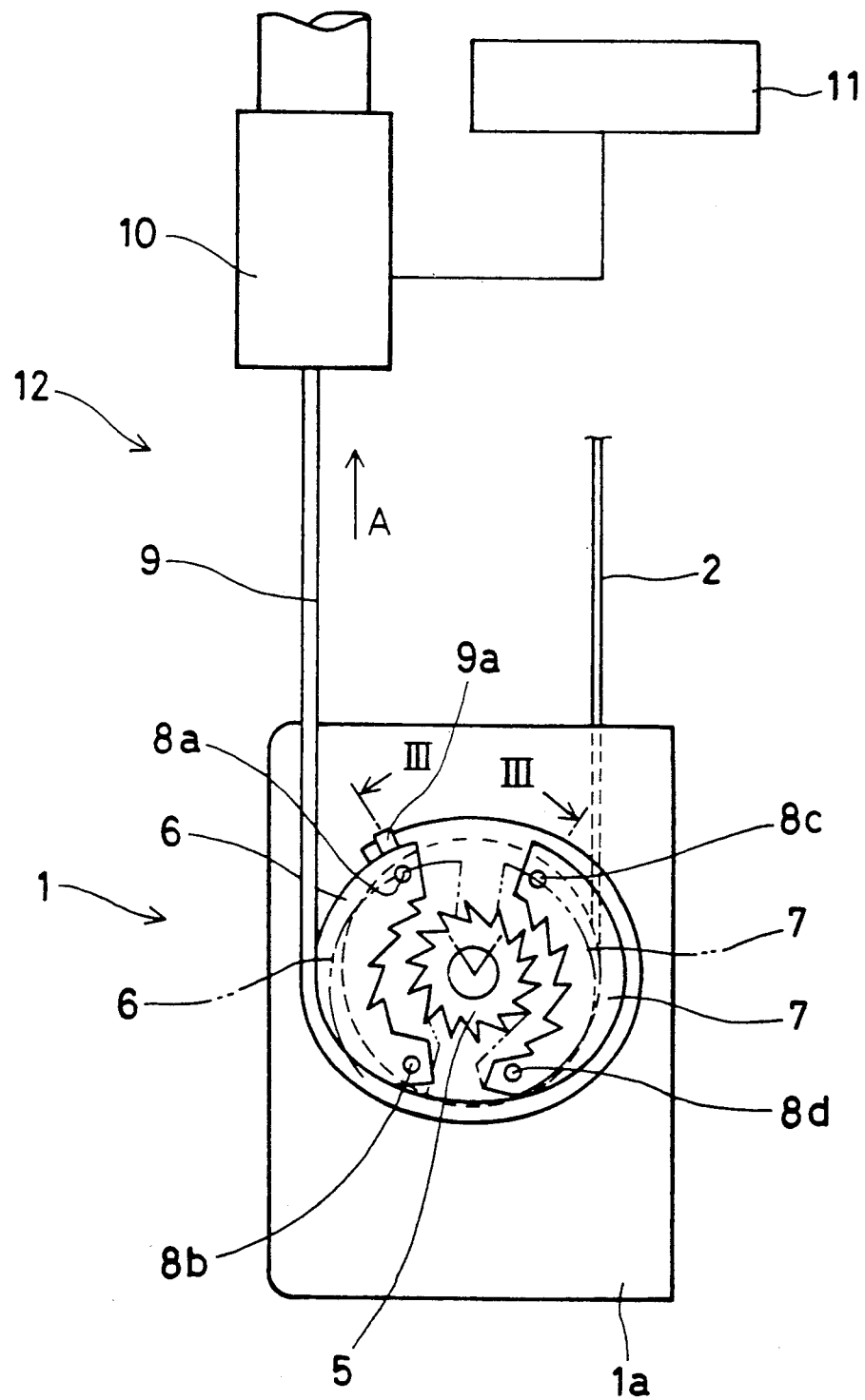
FIG. 2 is a side view showing the pretensioner.

One end of a wire rope 9 is attached at 9a to one end of the pawl gear 6 at its outer circumferential surface. Each of the pawl gears 6, 7 is formed to have a groove in its outer circumferential surface in which a turn of the wire rope, FIGS. 2 and 3, is wound. The other end of the wire rope 9 extends upwardly in FIG. 1 and is connected to a piston, as will be described later. The attached portion 9a at the one end of the wire rope 9 is designed to detach from the pawl gear 6 when a prescribed force greater than the size of the shearing force that breaks the location pins 8a through 8d is applied. One example of an expedient for realizing the attached portion 9a is to attach the one end of the wire rope 9 by a location pin that will be snapped by a predetermined shearing force greater than that which causes the location pins 8a through 8d to snap. It goes without saying that the wire rope 9 can be attached by other means.

As shown in FIG. 2, the other end of the wire rope 9 is connected to the piston (not shown) of drive means 10. Deceleration sensing means 11 is connected to the drive means 10 and is adapted to sense deceleration of a predetermined magnitude, and to output a signal indicative thereof, when the vehicle sustains such deceleration. In response to the sensor output signal, a gas producing agent (not shown) disposed within the drive means 10 undergoes a reaction and produces pressure that actuates the piston. Owing to motion of the piston, the wire rope 9 is pulled in the A direction by a predetermined force. In this embodiment of the present invention, the gear 5, the pair of pawl gears 6, 7, the wire rope 9 and the drive means 10 construct a slack removing mechanism 12.

The operation of this embodiment will now be described.

When the vehicle is traveling in ordinary fashion, only an amount of deceleration much smaller than that of a predetermined magnitude can be produced. Under these conditions, therefore, the deceleration sensing means does not produce an output signal and, hence, the wire rope 9 is not tensioned. The location pins 8a through 8d therefore do not break. As a result, the gear 5 remains spaced away from the two pawl gears 6, 7 and the reel 3 is capable of rotating freely. Accordingly, the seat belt 2 is capable of being taken up by the biasing force of the spring 4 and may be pulled out freely against the force of the spring.

When the vehicle sustains a certain degree of deceleration as at the time of emergency braking, the passenger wearing the seat belt 2 moves forwardly so that the seat belt starts to be pulled out at a certain degree of acceleration. At such time the reel locking mechanism of the retractor 1 is actuated and locks rotation of the reel 3. As a result, extraction of the seat belt 2 is checked and forward movement of the passenger in excess of a predetermined amount is prevented. In this case, the deceleration sensing means 11 does not produce an output signal and therefore the drive means 10 does not operate.

When the vehicle experiences a predetermined, very large amount of deceleration as in the event of a collision, the deceleration sensing means 11 senses this degree of deceleration and produces an output signal. In response to this output signal, the gas producing agent within the drive means 10 reacts and produces pressure that rapidly thrusts the piston upwardly. Owing to the driving force produced by the piston, the wire rope 9 is tensioned rapidly in the A direction by a force of a predetermined magnitude. Consequently, the two pawl gears 6, 7 are urged toward the gear 5 by a force of a predetermined magnitude, as a result of which the location pins 8a through 8d are subjected to a shearing force of a predetermined size and are caused to snap off. Accordingly, the two pawls 6, 7 are moved toward the gear 5 by the wire rope 9 so that the teeth 6a, 7a of the pawl gears 6, 7 engage with the teeth 5a of the gear 5, as indicated by the two-dot chain lines in FIG. 2. In this case, the axial movement of the two pawl gears 6, 7 is limited by the retractor frame 1b, which forms a portion that accommodates the retainer 8 and the spring 4. This assures that the teeth 6a, 7a will mesh with the teeth 5a in reliable fashion. Furthermore, since the two pawl gears 6, 7 move substantially along the radial direction of the gear 5, the teeth 5a on the one hand and the teeth 6a, 7a on the other are guided on each other's inclined surface to assure reliable engagement even if the positions at which the teeth 6a, 7a engage the teeth 5a undergo some displacement.

When the teeth 5a and the teeth 6a, 7a mesh, the gear 5 is rotated by the tensioning force of the wire rope 9, as a result of which the reel 3 is rotated in a direction to take up the seat belt 2. Thus, the seat belt 2 is tightened so that the slack which existed when the vehicle was traveling in ordinary fashion is eliminated.

Since the gear 5 is in meshing engagement with the pawl gears 6, 7, no slip occurs between the gear 5 and the gears 6, 7. Consequently, the reel 3 rotates reliably and the amount of rotation thereof is constant. This assures that the amount of tightening of the seat belt 2 also will be constant. Accordingly, the passenger wearing the seat belt 2 is restrained with a stabilized amount of belt tightening and experiences almost no forward movement.

When the attached portion 9a of the one end of wire rope 9 is subjected to a predetermined force greater than the shearing force that snaps off the location pins 8a through 8d, this end of the wire rope 9 becomes detached from the pawl gear 6. Thus, at the end of tightening of the seat belt 2 by the action of the drive means 10, the wire rope 9 becomes detached from the pawl gear 6, thereby making it possible for the gear 5 and the reel 3 to turn. Accordingly, even after the pretensioner has operated, the seat belt 2 is still capable of being fastened for temporary purposes. In other words, if the damage suffered in a collision is comparatively light, such as a damaged bumper or fender, and the driver is capable of driving the vehicle under its own power, the seat belt 2 can still be fastened temporarily to assure safety while the vehicle is driven to a garage or the like for repairs.

Figure 4:
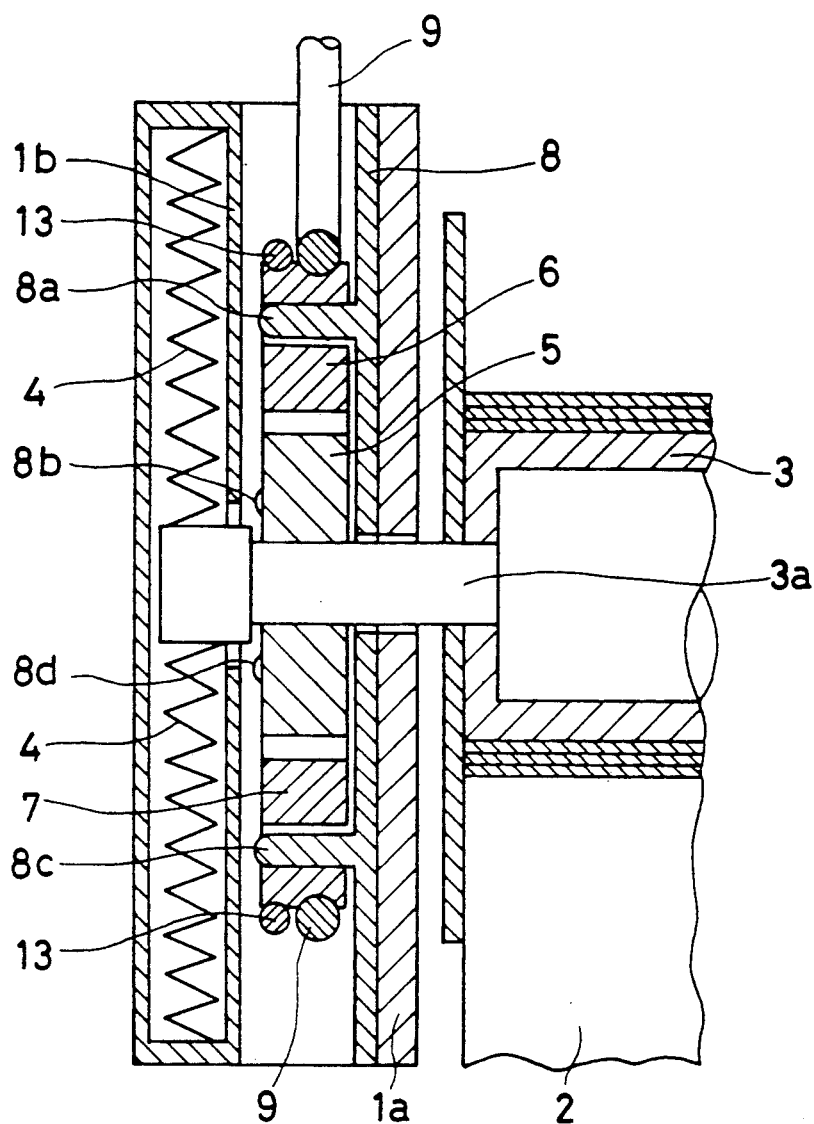
FIG. 4 is a sectional view, similar to that of FIG. 3, showing another embodiment of the present invention.

FIG. 4 is a diagram similar to that of FIG. 3 and shows another embodiment of the present invention, in which portions identical to those of the first embodiment are designated by like reference characters and need not be described again. The operation of these portions also is similar to that of the first embodiment and a description thereof is deleted. Only portions differing from those of the first embodiment are described.

Figure 5:
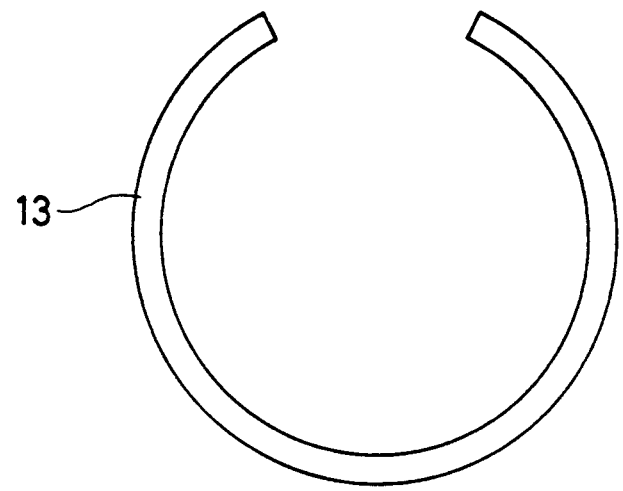
FIG. 5 is a plan view of a spring used in this embodiment.

As shown in FIG. 4, a spring 13 is disposed on the outer circumferential surfaces of the two pawl gears 6, 7 so as to span these two gears. Owing to the action of the spring 13, the two pawl gears 6, 7 are urged toward each other, namely toward the gear 5, at all times. As shown in FIG. 5, the spring 13 is formed to have a generally C-shaped configuration.

In this embodiment constructed as set forth above, the drive means 10 is actuated to pull the wire rope 9 rapidly in the A direction by a force of a very large size when a predetermined deceleration of a very large magnitude is sustained, as at the time of a collision. This causes the location pins 8a through 8d to snap. As a result, the two pawl gears 6, 7 are moved toward the gear 5 so that the teeth 6a, 7a of the respective pawls 6, 7 mesh with the teeth 5a of the gear 5. In this case, the two pawl gears 6, 7 are moved rapidly toward the gear 5 by the biasing force of the spring 13. The meshing engagement between the teeth 5a of gear 5 and the teeth 6a, 7a of pawl gears 6, 7 therefore is achieved much more rapidly and reliably, and the pretensioner is capable of operation with greater certainty. Accordingly, the passenger-restraining effect of the seat belt 2 manifests itself to a much greater extent.

The present invention is not limited to the foregoing embodiments but can be modified in various ways.

For example, though the entire outer circumference of the gear 5 is provided with the teeth 5a, it is permissible to provide the teeth 5a on only part of the outer circumference of the gear 5. In addition, the gear 5 can be constituted by a gear other than the ratchet wheel-type gear described above. In such case, it is desired that the gear teeth be shaped in such a manner that the tip of each tooth broadens toward the center of the gear wheel. Adopting such an arrangement will make it possible for the pawl gears 6, 7 to reliably mesh with the teeth of the gear.

Further, if the outer side faces of the pawl gears 6, 7 are provided with a guide which guides the wire rope 9, the latter will not slip off the pawl gears 6, 7. Therefore, the engagement between the teeth 5a and the teeth 6a, 7a and the tightening of the seat belt 2 can be performed with greater certainty.

In the embodiments described above, the wire rope 9 becomes detached from the pawl gear 6 when a load of a certain magnitude acts upon the one end of the wire rope 9. However, it can be so arranged that the wire rope 9 does not detach from the pawl gear 6.

Thus, in accordance with the present invention, as should be apparent from the foregoing description, a mechanism for removing slack from a seat belt is constituted by drive means actuated in response to a detection signal indicative of a predetermined degree of deceleration, and an engaging member which, owing to a driving force produced by the drive means, is meshed with a gear that co-rotates with the aforementioned reel for rotating the reel in a direction that removes slack from the seat belt. When deceleration of a predetermined magnitude is sustained, as at the time of a collision, slack in the seat belt can be eliminated reliably and the amount of seat belt tightening can be made substantially constant. Accordingly, the seat belt is capable of functioning at maximum effectiveness to more effectively restrain the passenger wearing the seat belt.

Since the engaging member is biased in the direction of the gear at all times using the spring, the engaging member is meshed with the gear more quickly and reliably by the driving force from the drive means. Accordingly, the amount of forward movement of the passenger wearing the seat belt can be reduced to a greater extent, and the restraining effect of the seat belt can be maximized.

Furthermore, it is so arranged that the wire rope becomes detached from the engaging member when a predetermined force larger than the force that meshes the engaging member with the gear is applied. As a result, after the seat belt is tightened by the pretensioner, the seat belt can be used temporarily. Accordingly, if the driver is capable of driving the vehicle under its own power after a collision, the seat belt can still be fastened temporarily to assure safety while the vehicle is driven to a garage or the like for repairs.

What I claim is:

1. A pretensioner in an automotive vehicle seat belt apparatus having deceleration sensing means for sensing vehicle deceleration in a predetermined magnitude, and a slack removing mechanism which, in response to a detection signal from said sensing means, rotates a seat belt take-up reel in a direction that removes slack from the seat belt, said slack removing mechanism comprising:

drive means actuated in response to said selection signal; and an engaging member which, owing to a driving force produced by said drive means, is meshed with a gear that co-rotates with the reel for rotating said reel in a direction that removes slack from the seat belt;

said engaging member being biased at all times in the direction of said gear by a spring.

2. The pretensioner according to claim 1, wherein there is provided a wire rope for transmitting the driving force of said drive means to said engaging member, said wire rope being attached to said engaging member so as to detach therefrom when a prescribed force greater than that which meshes with said engaging member with said gear is applied.

* * * * *